B. C. Scott,
Feed Trough.
No. 93,234.  Patented Aug. 3, 1869.
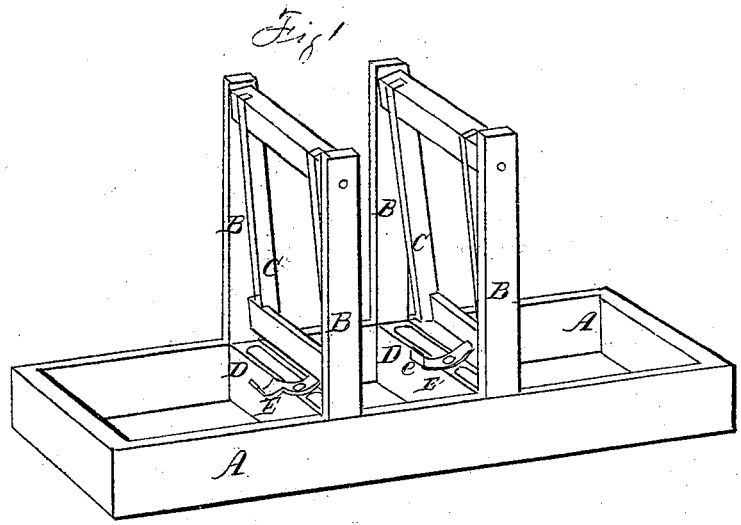
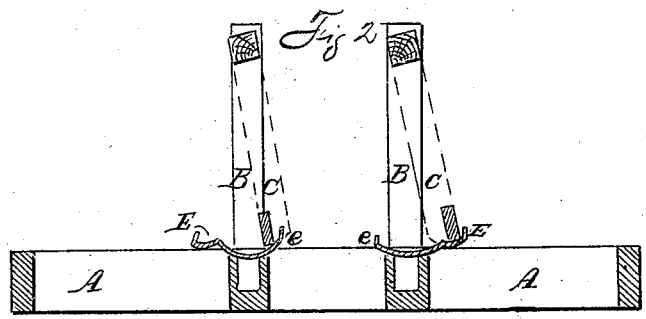
Witnesses:
H. S. Sprague
E. P. Bugbie
Inventor:
B. C. Scott
per Atty
Thos. S. Sprague

United States Patent Office.

BENONI C. SCOTT, OF PAXTON, ILLINOIS.

Letters Patent No. 93,234, dated August 3, 1869.

---

IMPROVEMENT IN FEEDING-DOORS FOR ANIMAL-PENS.

---

The Schedule referred to in these Letters Patent and making part of the same

---

*To whom it may concern:*

Be it known that I, BENONI C. SCOTT, of Paxton, in the county of Ford, and State of Illinois, have invented a new and useful Improvement in Feeding-Door for Animal-Pens; and I do declare that the following is a true and accurate description thereof, reference being had to the accompanying drawings, and to the letters of reference marked thereon, and being a part of this specification.

Figure 1 is a perspective view of my improved pen, with the sides, covering, and floor removed.

Figure 2 is a cross-section of one of the feed-troughs and door, showing the operation of the door-spring.

Like letters refer to like parts in each figure.

The nature of this invention relates to an improved construction of pens for hogs, sheep, and cattle; and consists in providing such pens with a hanging door, over the feed-troughs, so arranged that when filling the troughs, said door will be confined to the rear of said troughs, and prevent the animals from crowding to the trough while being filled, which being done, the door is released, and swings forward, giving each animal in the pen an even chance to get his share of the food.

In the drawings—

A represents the sills of a double hog-pen, with a hall between them, formed by the covering of the standards B and doors C, suspended, at their tops, between said standards.

D are feeding-troughs, situated under and in the rear of the lower edges of the doors, when the latter are hanging free.

E are spring-stops of elastic metal, secured at one end to the troughs, and project far enough into the pen to hold the door away from the trough in filling it.

e is a stop, formed by turning up the front end of the spring, to prevent the door from being forced outward, and thus allow the animals to leave the pen.

The operation of the device is as follows:

The attendant wheels a barrow filled with feed into the hall, and throws the doors C back from the troughs until the end of the spring engages with the front side of the door, which is there held, preventing the animals from having access to the trough until it is filled, which being completed, he presses the spring with his foot, releasing the door, which then falls forward by its own gravity, and permits all the animals in the pen to have simultaneous access to the contents of the trough.

A modification of my feeding-door is equally adapted to feeding-racks for sheep and stalls for cattle.

What I claim as my invention, and desire to secure by Letters Patent, is—

The feed-doors for animal-pens, above described, consisting of the door C, suspended from its top, and working in the frame B, and the spring E, with its stop e, to regulate and control the movements of said door, when used in connection with the troughs D and the pens A, as and for the purpose above set forth.

BENONI C. SCOTT.

Witnesses:
H. F. EBERTS,
H. S. SPRAGUE.